(12) United States Patent
Kim et al.

(10) Patent No.: US 11,027,658 B2
(45) Date of Patent: Jun. 8, 2021

(54) LAMP FOR VEHICLE

(71) Applicant: SL Mirrortech Corporation, Siheung-si (KR)

(72) Inventors: Yong Hwan Kim, Siheung-si (KR); Won Bin Kim, Siheung-si (KR); Chang Byung Ryu, Siheung-si (KR); Yong Won Seo, Siheung-si (KR)

(73) Assignee: SL Mirrortech Corporation, Siheung-si (KR)

( * ) Notice: Subject to any disclaimer, the term of this patent is extended or adjusted under 35 U.S.C. 154(b) by 0 days.

(21) Appl. No.: 16/870,309

(22) Filed: May 8, 2020

(65) Prior Publication Data

US 2021/0009040 A1     Jan. 14, 2021

(30) Foreign Application Priority Data

Jul. 10, 2019   (KR) ........................ 10-2019-0083204

(51) Int. Cl.
| | | |
|---|---|---|
| *B60R 1/12* | (2006.01) | |
| *F21S 43/40* | (2018.01) | |
| *F21S 43/241* | (2018.01) | |
| *F21S 43/245* | (2018.01) | |

(52) U.S. Cl.
CPC .......... *B60R 1/1207* (2013.01); *F21S 43/241* (2018.01); *F21S 43/245* (2018.01); *F21S 43/40* (2018.01)

(58) Field of Classification Search
CPC ..... B60R 1/1207; F21S 43/241; F21S 43/245; F21S 43/40
See application file for complete search history.

(56) References Cited

U.S. PATENT DOCUMENTS

2018/0072232 A1*   3/2018   Negel ................. F21S 43/27

FOREIGN PATENT DOCUMENTS

| KR | 10-20170070874 A | 6/2017 |
|---|---|---|
| KR | 10-20190071515 A | 6/2019 |

* cited by examiner

*Primary Examiner* — Thomas M Sember
(74) *Attorney, Agent, or Firm* — Nelson Mullins Riley & Scarborough LLP; Kongsik Kim, Esq.

(57) ABSTRACT

A lamp for vehicle includes a light source unit including a light source and a light guide unit which emits light incident from the light source to form an image having a predetermined shape; a lamp assembly including a lamp housing and a lens unit coupled to the lamp housing to form a space for accommodating the light source unit and a plurality of lamp components; and a position fixing unit formed on one side in the lamp assembly to fix a position of the light source unit. The position fixing unit comprises a first contact portion that contacts at least a portion of a lower surface of the light guide unit; and a second contact portion that contacts at least a portion of an upper surface of the light guide unit.

17 Claims, 11 Drawing Sheets

LAMP FOR VEHICLE

CROSS-REFERENCE TO RELATED APPLICATION

This application claims the benefit of priority from Korean Patent Application No. 10-2019-0083204 filed on Jul. 10, 2019, the contents of which in their entirety are herein incorporated by reference.

BACKGROUND

1. Technical Field

The present disclosure relates to a lamp for a vehicle, and more particularly, to a lamp for a vehicle capable of informing a nearby vehicle or pedestrian of a driving state of the vehicle.

2. Description of the Related Art

Generally, a vehicle is equipped with various lamps having an illumination function for more easily recognizing an object near the vehicle at low light conditions (e.g., nighttime driving), and a signal function for informing a nearby vehicle or pedestrian of a driving state of the vehicle. For example, the main purpose of head lamps and fog lamps is the illumination function, and the main purpose of turn signal lamps, tail lamps, brake lamps, or side markers is the signal function.

In addition, the interior of the vehicle is further provided with a room lamp that is lit in conjunction with the opening of a door and a map lamp for viewing a map or book. In addition to the illumination and signal functions, the lamp for the vehicle is considered to be important for the appearance of the vehicle. In particular, in the case of the head lamp or the tail lamp, it is a major factor that determines the appearance of the vehicle at the nighttime driving.

In other words, the lamp for the vehicle has a significant impact on the functional aspect of helping a driver to drive safely by enabling the driver's visibility, which is a basic role. Further, the aesthetic aspect through design improvements that a consumer perceives presents a significant impact on the consumer's decision for buying a vehicle.

As such, as the aesthetic design of the lamp for the vehicle as well as the performance of the lamp for the vehicle becomes more important, there is an increasing demand for the lamp for the vehicle of various exterior designs while satisfying the requirements of the illumination function and the signal function. To this end, the use of light guides that form various shapes is increasing. The light guide guides light incident from a light source to an inside to emit the light, and has a decreased light loss as a whole and an excellent spectrum of emitted light.

The light guide may be inadvertently separated from its position due to vibration or external shock generated during operation of the vehicle. To prevent this problem, a structure for fixing the position of the light guide is added. However, in this case, there is a problem that the configuration becomes complicated, and the cost increases.

Therefore, there is a need for preventing the movement of the light guide while avoiding the complexity of the configuration and the increase of the cost.

SUMMARY

Aspects of the present disclosure provide a lamp for a vehicle capable of easily fixing a position of a light source unit, from which light for forming an image of a predetermined configuration is emitted, without adding a separate component for fixing the position of the light source unit. However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a lamp for vehicle may include a light source unit including a light source and a light guide unit which emits light incident from the light source to form an image having a predetermined shape; a lamp assembly including a lamp housing and a lens unit coupled to the lamp housing to form a space for accommodating the light source unit and a plurality of lamp components; and a position fixing unit formed on one side in the lamp assembly to fix a position of the light source unit. The position fixing unit may comprise a first contact portion that contacts at least a portion of a lower surface of the light guide unit; and a second contact portion that contacts at least a portion of an upper surface of the light guide unit.

The light guide unit may include a light guide to form the image and an extension portion formed to extend rearward from the light guide. The first contact portion may contact a lower surface of the light guide. Further, the first contact portion may contact both a lower surface of the light guide and a lower surface of the extension portion. The second contact portion may contact an upper surface of the extension portion.

The first contact portion may be formed to extend from a front of the light guide unit toward a rear thereof, and the second contact portion may be formed to extend from the rear of the light guide unit toward the front thereof. The plurality of lamp components may include a first lamp component in which the first contact portion is formed; and a second lamp component disposed behind the first lamp component and having the second contact portion formed therein. The first lamp component may be a bezel disposed in front of the light source unit to guide the light generated from the light source unit to the lens unit, and the second lamp component may be a reflector disposed behind the light source unit and reflecting the light generated from the light source unit forward. Alternatively, the first lamp component may be a bezel disposed in front of the light source unit to guide light generated from the light source unit to the lens unit, and the second lamp component may be the lamp housing disposed behind the light source unit.

A locking groove into which a locking projection formed on the extension portion is inserted may be formed in the second lamp component. The first contact portion may include a locking jaw formed to protrude upward from a surface on which the lower surface of the light guide unit is seated in the front of the light guide unit.

Each of the first contact portion and the second contact portion may be formed to contact opposite surfaces of the light guide unit in a vertical direction and opposite surfaces of the light guide unit in a horizontal direction. A lower surface of the light guide may be disposed above a lower surface of the extension portion, and an end portion of the first contact portion may contact a stepped surface between the lower surface of the light guide and the lower surface of the extension portion. An upper surface of the light guide may be disposed above an upper surface of the extension portion, and an end portion of the second contact portion may contact a stepped surface between the upper surface of the light guide and the upper surface of the extension portion.

At least one of the upper surface or the lower surface of the light guide unit may include a stepped surface having an insertion groove into which an end of the first contact portion or the second contact portion is inserted.

A half mirror disposed in front of the light guide unit may be further provided, and the half mirror and a lamp component that faces the half mirror among the plurality of lamp components may reflect the light emitted from the light guide unit to each other to form an original image of the light guide unit and at least one repetitive image formed by reflecting the original image. The half mirror may be formed on at least one surface of the lens unit. An inner lens disposed behind the lens unit may be further provided, and the half mirror may be formed on at least one surface of the inner lens.

A lamp for a vehicle according to the present disclosure has one or more of the following benefits. Since a position of a light source unit may be fixed by a plurality of lamp components assembled with the light source unit without adding a separate component for fixing the position of the light source unit, the configuration may be prevented from becoming complicated, and the cost may be prevented from increasing.

The benefits of the present disclosure are not limited to the above-mentioned benefits, and other benefits not mentioned may be clearly understood by a person skilled in the art from the claims.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
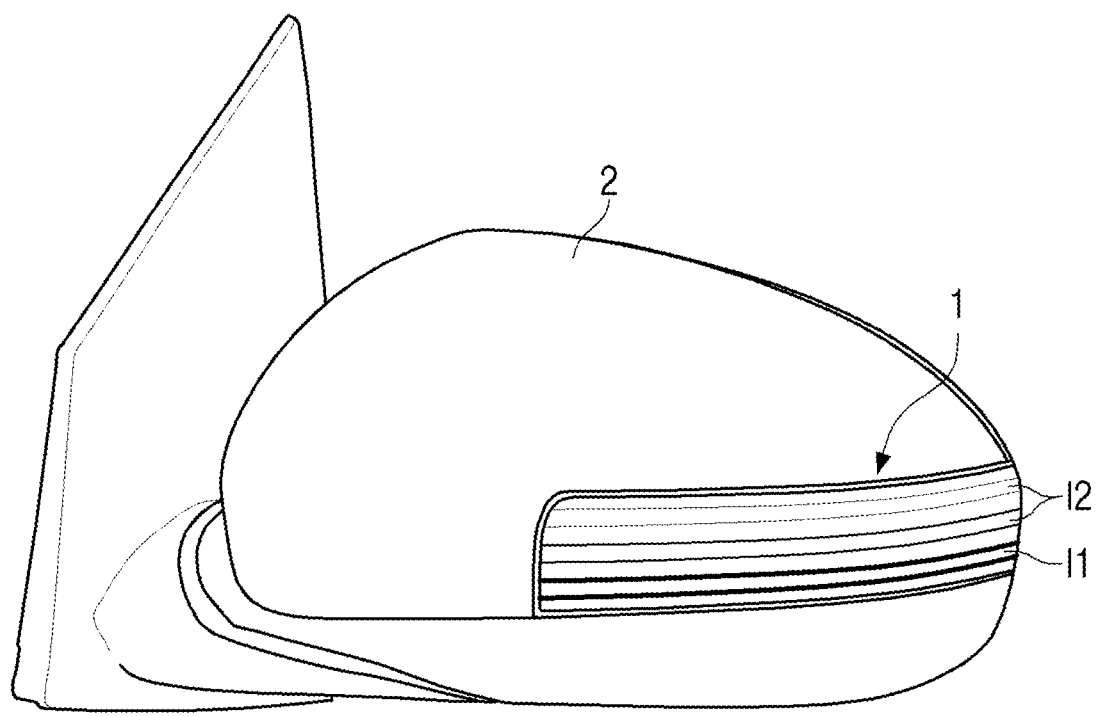
FIG. 1 is a schematic view showing a side mirror having a lamp for a vehicle according to an exemplary embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some exemplary embodiments, well-known steps, structures and techniques will not be described in detail to avoid obscuring the disclosure.

The terminology used herein is for the purpose of describing particular exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the disclosure are described herein with reference to plan and cross-section illustrations that are schematic illustrations of exemplary embodiments of the disclosure. As such, variations from the shapes of the illustrations as a result, for example, of manufacturing techniques and/or tolerances, are to be expected. Thus, exemplary embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, the present disclosure will be described with reference to the drawings for explaining a lamp for a vehicle according to exemplary embodiments of the present disclosure.

FIG. 1 is a schematic view showing a side mirror having a lamp for a vehicle according to an exemplary embodiment of the present disclosure. Referring to FIG. 1, the lamp for the vehicle 1 according to the exemplary embodiment of the present disclosure may be used as a signal lamp for informing a vehicle or a pedestrian of a driving state of the vehicle, such as a turn signal lamp or a position lamp which is provided in a side mirror 2 which is installed on or near a front door of the vehicle to secure a rear view. However, the present disclosure is not limited thereto, and the lamp for the vehicle 1 of the present disclosure may be used for various lamps installed in the vehicle. Further, a position of installation may be changed in various ways according to the use of the lamp for the vehicle 1 of the present disclosure.

Further, the lamp for the vehicle 1 of the exemplary embodiment of the present disclosure may repeatedly form images I1 and I2 of a predetermined shape. The lamp for the vehicle 1 of the present disclosure may form an original image I1 of a predetermined shape and a predetermined number of repeated images I2 which has a similar geometry with a predetermined similarity ratio with respect to the original image I1. However, the present disclosure is not limited thereto, and the lamp for the vehicle 1 of the present disclosure may form a single image.

Figure 2:
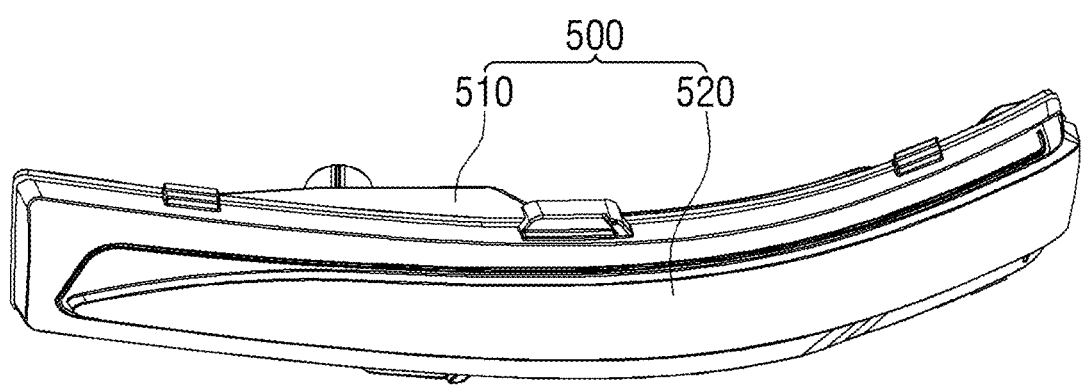
FIG. 2 is a perspective view showing a lamp for a vehicle according to an exemplary embodiment of the present disclosure.
Figure 3:
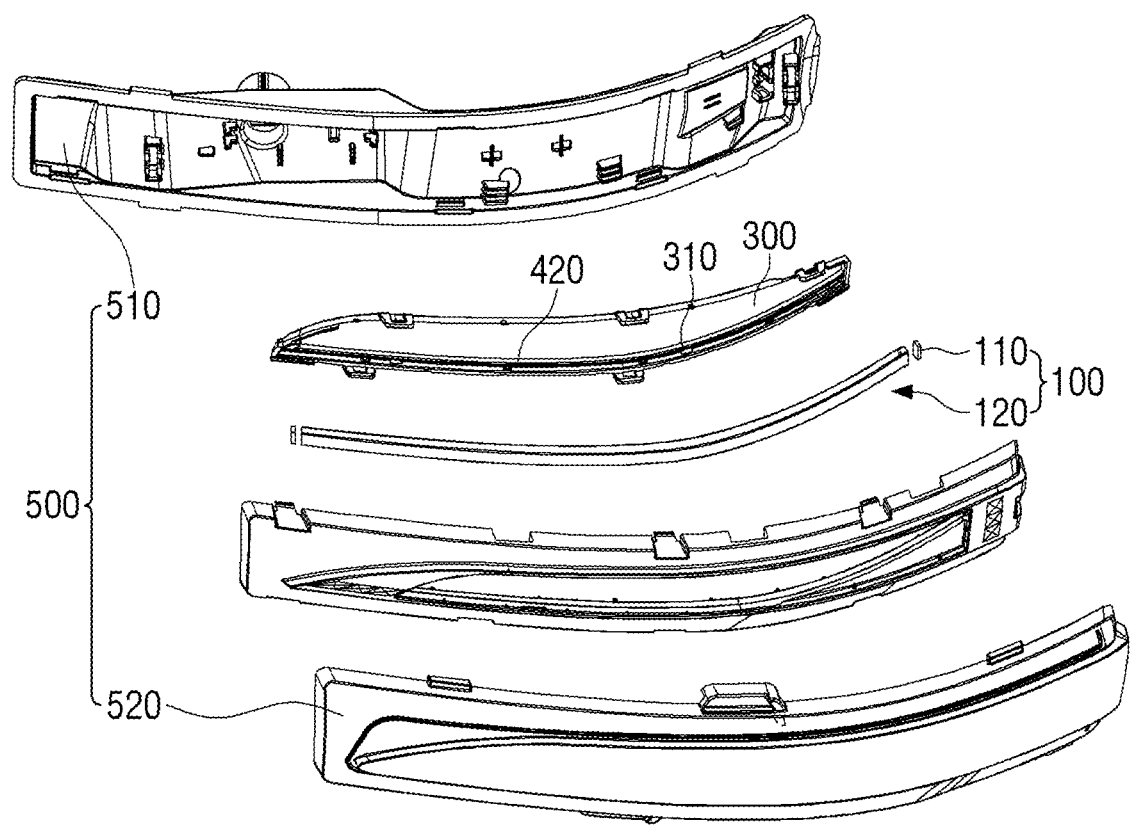
FIGS. 3 to 5 are exploded perspective views showing a lamp for a vehicle according to an exemplary embodiment of the present disclosure.
Figure 4:
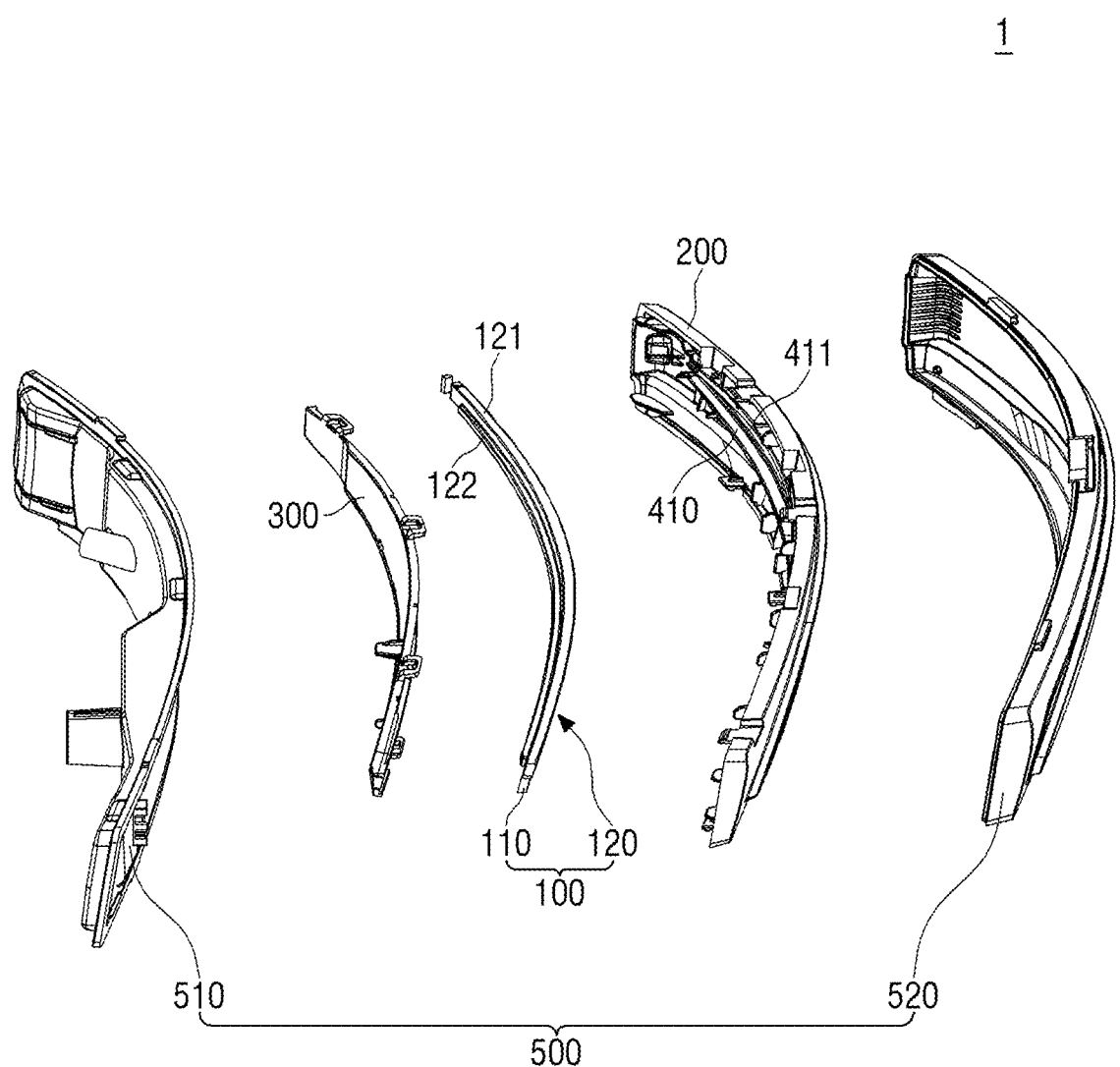
Figure 5:
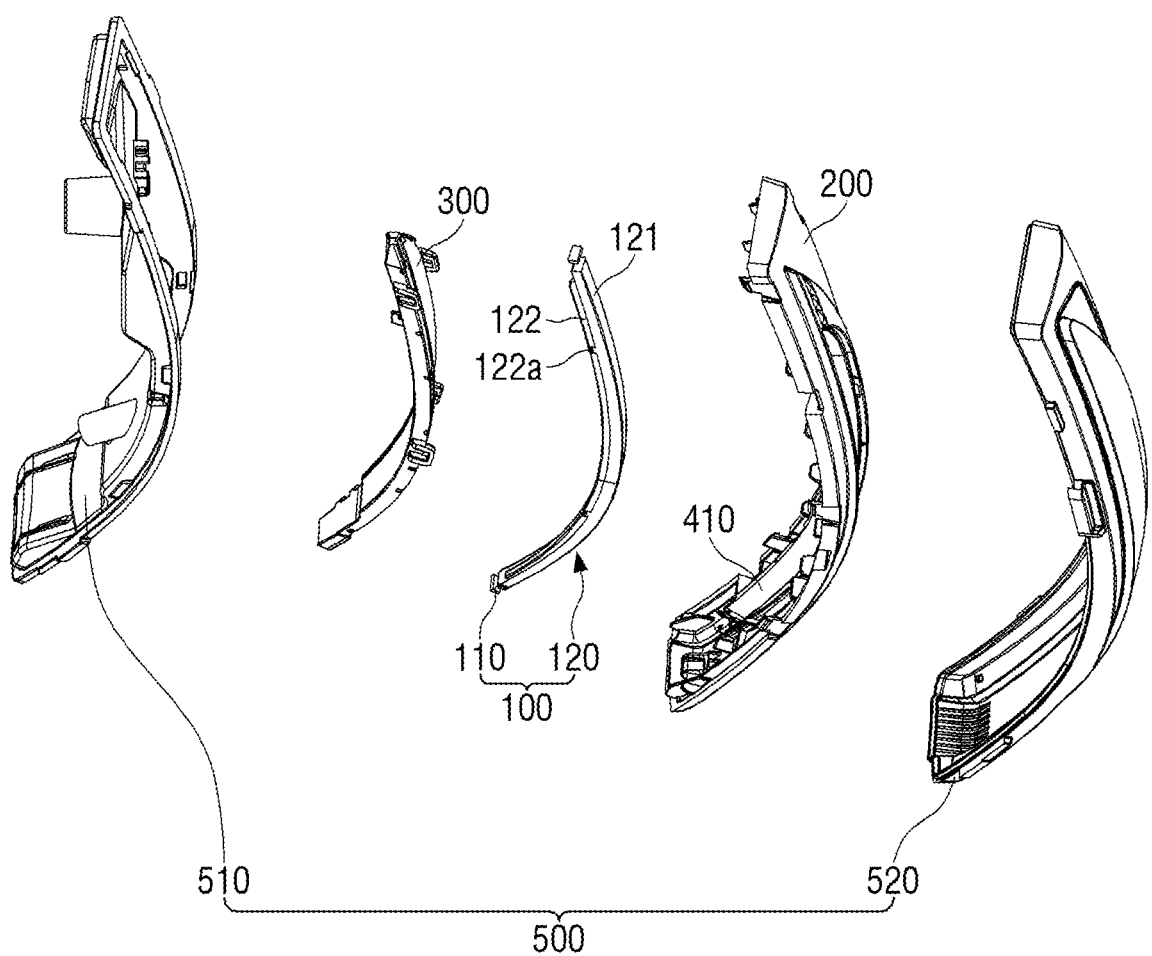
Figure 6:
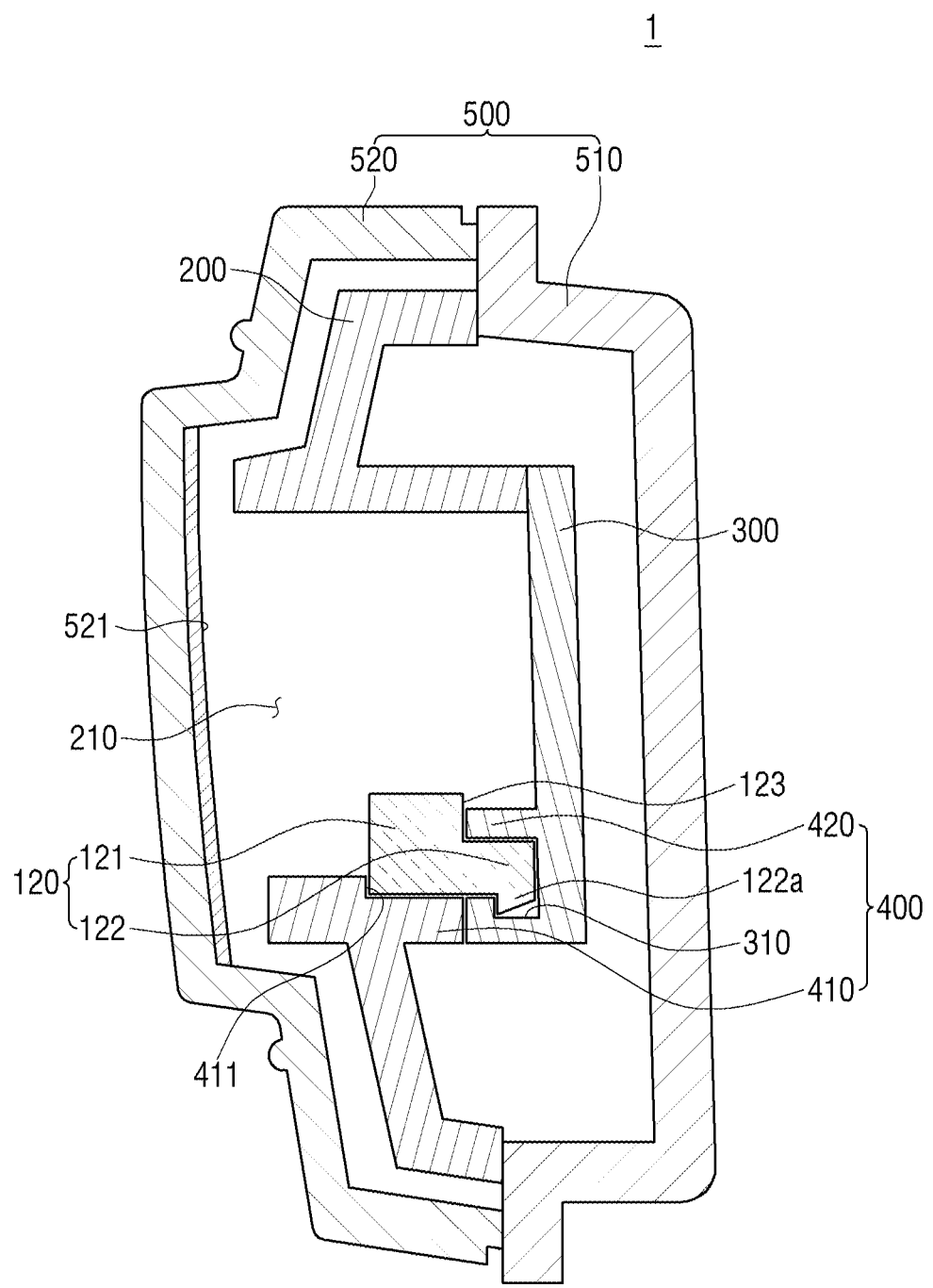
FIG. 6 is a cross-sectional view showing a lamp for a vehicle according to an exemplary embodiment of the present disclosure.

FIG. 2 is a perspective view showing the lamp for the vehicle according to the exemplary embodiment of the present disclosure. FIGS. 3 to 5 are exploded perspective views showing the lamp for the vehicle according to the exemplary embodiment of the present disclosure. FIG. 6 is a cross-sectional view showing the lamp for the vehicle according to the exemplary embodiment of the present disclosure.

Referring to FIGS. 2 to 6, the lamp for the vehicle 1 according to the exemplary embodiment of the present disclosure may include a light source unit 100, a plurality of lamp components 200 and 300, and a position fixing unit 400. The light source unit 100, the plurality of lamp components 200 and 300, and the position fixing unit 400 may be accommodated within an interior space of a lamp assembly 500 that includes a lamp housing 510 and a lens unit 520 coupled to the lamp housing 510.

The light source unit 100 may include a light source 110 and a light guide unit 120. In the exemplary embodiment of the present disclosure, a semiconductor light emitting element such as an LED may be used as the light source 110. However, the present disclosure is not limited thereto, and various kinds of light sources, such as a bulb, may be used as the light source 110. Further, the number of light sources 110 or a color of light generated from the light source 110 may be varied according to the amount of light or color required in the lamp for the vehicle 1 of the present disclosure. In addition, the light source 110 may be controlled to maintain a constantly illuminated state or to blink based on the usage of the lamp for the vehicle 1 of the present disclosure.

The light guide unit 120 may emit light incident from the light source 110 to form an image of a predetermined shape or configuration. The light guide unit 120 may be formed in a straight line, a curved line, or a combination thereof. In the exemplary embodiment of the present disclosure, the light guide unit 120 may be formed in a line shape in which a straight line and a curved line are combined. In the exemplary embodiment of the present disclosure, the light guide unit 120 may emit light incident from the light sources 110 respectively disposed near both ends to form an image of a predetermined shape.

Hereinafter, in the exemplary embodiment of the present disclosure, among surfaces of the light guide unit 120, a surface disposed in a direction in which the light guide unit 120 is seated is referred to as a lower surface, and an opposite side thereof is referred to as an upper surface which may serve as an emission surface. However, the lower surface and the upper surface of the light guide unit 120 are not based on a direction of gravity, but are based on a direction in which the light guide unit 120 is seated. Depending on the direction in which the light guide unit 120 is seated, the direction that the lower surface and the upper surface of the light guide unit 120 actually indicate may vary.

The light guide unit 120 may include a light guide 121 and an extension portion 122. The light guide 121 may emit the light incident from the light source 110 to form an image of a predetermined shape. It may be understood that an upper surface of the light guide 121 of the upper surfaces of the light guide unit 120 serves as the emission surface of the light guide unit 120.

The extension portion 122 may extend rearward from the light guide 121 to prevent the extension portion 122 from being visible from the outside. Therefore, it may serve to fix a position of the light guide unit 120 without affecting light emitted from the light guide 121. In other words, when the light emitted from the upper surface of the light guide 121 forms the image of the predetermined shape, but some portion of the upper surface of the light guide 121 is obstructed, a shape of the image may become incomplete. Therefore, the extension portion 122 may be formed to extend toward the rear from the light guide 121, thereby enabling the position of the light guide unit 120 to be fixed without covering or obstructing the upper surface of the light guide 121. Detailed description thereof will be described later.

Herein, a direction in which the light is emitted from the lens unit 520 is defined as a front, and therefore, depending on the installation location of the lamp for vehicle 1 with respect to the vehicle, the absolute direction that the front and rear directions refer to may vary.

The plurality of lamp components 200 and 300 together with the light source unit 100 may be disposed within the interior space of the lamp assembly 500. It may be understood that the plurality of lamp components 200 and 300 perform a function suitable for the usage of the lamp for the vehicle 1 of the present disclosure. The plurality of lamp components 200 and 300 may include components for adjusting properties of the light (e.g., a light path, a light brightness, etc.) generated from the light source unit 100 or assembling the lamp for the vehicle 1 of the present disclosure. In the exemplary embodiment of the present disclosure, the plurality of lamp components 200 and 300 may include a first lamp component 200 and a second lamp component 300. However, this is only an example to help understand the present disclosure. The present disclosure is not limited thereto, and it may include various components housed in the interior space of the lamp assembly 500.

In addition, in the exemplary embodiment of the present disclosure, the first lamp component 200 may be a bezel that serves to guide the light generated from the light source unit 100 to the lens unit 520 and to prevent the interior of the lamp assembly 500 from being visible from the exterior of the vehicle so that the appearance thereof is not degraded. The second lamp component 300 may be a reflector disposed at the rear of the first lamp component 200 and may reflect the light generated from the light source unit 100 toward the front. Hereinafter, in the exemplary embodiment of the present disclosure, the first lamp component 200 will be referred to as a bezel, and the second lamp component 300 will be referred to as a reflector.

A half mirror 521 may be formed on at least one surface of the lens unit 520. In the exemplary embodiment of the present disclosure, the half mirror 521 may be formed on an inner surface of the lens unit 520 opposite to a reflective surface of the reflector 300. However, the present disclosure is not limited thereto, and the half mirror 521 may be formed on at least one of an outer surface or an inner surface of the lens unit 520. The half mirror 521 may reflect a portion of incident light and transmit another portion thereof, and may be coated with a metal coating layer, for example a chromium coating, an aluminum coating or a metal oxide layer. Such a metal coating layer may be formed by a method such as spin coating, spray coating, sputter deposition, vacuum deposition, plasma deposition, or the like. Alternatively, instead of forming a metal coating layer, the half mirror 521 may be formed as a separate film form and attached to at least one surface of the lens unit 520. The half mirror 521 may cause the images I1 and I2 of FIG. 1 to be repeatedly formed while reflecting light along with the reflector 300.

Figure 7:
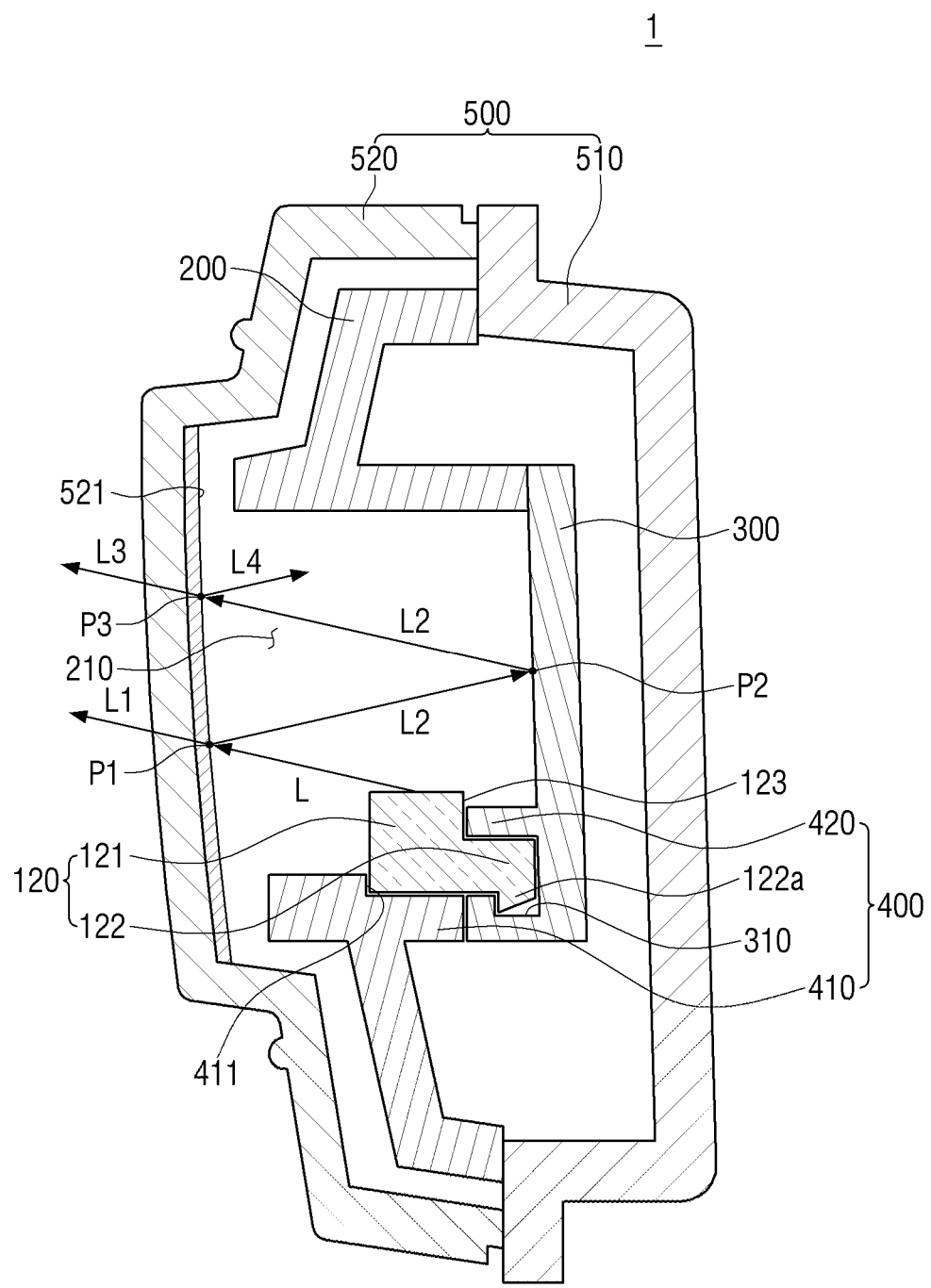
FIG. 7 is a schematic view showing an optical path of a lamp for a vehicle according to an exemplary embodiment of the present disclosure.

FIG. 7 is a schematic view showing an optical path of a lamp for a vehicle according to an exemplary embodiment of the present disclosure. Referring to FIG. 7, a first part light L1 among the light L that is incident from the light guide unit 120, i.e., the light guide 121, to a first point P1 of the half mirror 521 may be transmitted through the half mirror 521, and a second part light L2 may be reflected toward the reflector 300. The second part light L2 reflected from the half mirror 521 at the first point P1 may reach the half mirror 521 at a second point P2 of the reflector 300 to be reflected back toward the half mirror 521 and to enter a third point P3. Subsequently, a third part light L3 of the second part light L2 that is incident to the third point P3 of the half mirror 521 may be transmitted through the half mirror 521. A fourth part light L4 may be reflected back to the reflector 300.

In particular, an image formed by the first part light L1 being transmitted through the first point P1 of the half mirror 521 may be the original image I1 of the light guide unit 120, i.e., the light guide 121, and an image formed by the third part light L3 being transmitted through the third point P3 of the half mirror 521 may be the repeated image I2 formed by reflecting the original image I1.

As such, in the exemplary embodiment of the present disclosure, as the light is repeatedly transmitted or reflected between the half mirror 521 and the reflector 300, the images I1 and I2 of FIG. 1 may be formed. The third part light L3 being transmitted through the third point P3 as described in FIG. 7 may have a brightness that is less than a brightness of the first part light L1 being transmitted through the first point P1 because the amount of light is less. Therefore, the brightness of the image may gradually decrease from a first side proximate to the light guide unit 120 toward a second side distant from the light guide unit 120, thereby providing a three-dimensional effect.

Figure 8:
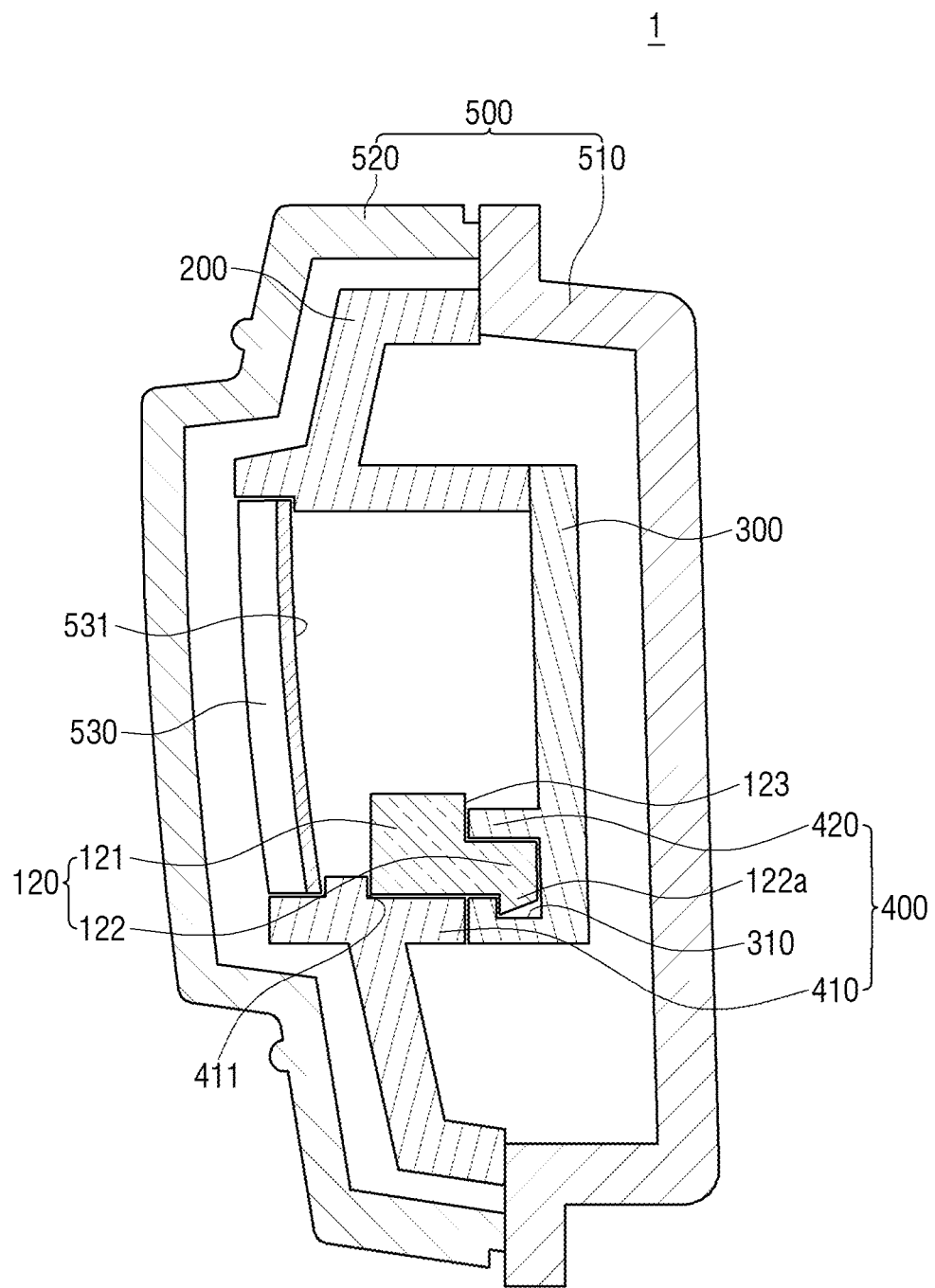
FIG. 8 is a schematic view showing an inner lens having a half mirror formed according to an exemplary embodiment of the present disclosure.

In the exemplary embodiment of the present disclosure, the half mirror 521 may be formed in the lens unit 520. However, the present disclosure is not limited thereto, and the half mirror may be formed as a separate lens that is separately provided from the lens unit 520. For example, as shown in FIG. 8, an inner lens 530 may be additionally provided between the lens unit 520 and the reflector 300, in which the half mirror 531 may be formed on at least one surface of the inner lens 530. In this case, as the light is transmitted or reflected between the half mirror 531 formed in the inner lens 530 and the reflector 300, the images I1 and I2 of FIG. 1 may be formed.

In particular, the inner lens 530 of FIG. 8 may be selected considering the sharpness, brightness, or the like of the images I1 and I2 formed by the lamp for the vehicle 1 of the present disclosure. The number of lenses or curvature of the lenses added between the lens unit 520 and the reflector 300 may be varied depending on the sharpness, brightness, or the like of the images I1 and I2 required in the lamp for the vehicle 1 of the present disclosure.

The position fixing unit 400 may be formed at one side in the lamp assembly 500 to fix a position of the light source unit 100, thereby preventing the light source unit 100 from being displaced from the position thereof due to the vehicle operation or an external impact. It may be understood that the fixation of the position of the light source unit 100 by the position fixing unit 400 effectively refers to the fixation of the position of the light guide unit 120 in order to form an image suitable for the usage of the lamp for the vehicle 1 of the present disclosure.

The position fixing unit 400 may include a first contact portion 410 disposed to contact at least a portion of the lower surface of the light guide unit 120, and a second contact portion 420 disposed to contact at least a portion of the upper surface of the light guide unit 120. The contact of the first contact portion 410 with the lower surface of the light guide unit 120 may include contacting two or more surfaces including the lower surface of the light guide unit 120. Similarly, the contact of the second contact portion 420 with the upper surface of the light guide unit 120 may include contacting two or more surfaces including the upper surface of the light guide unit 120.

For example, the first contact portion 410 may be in contact with the lower surface and a side surface of the light guide unit 120, and the second contact portion 420 may also be in contact with the upper and lower surfaces of the light guide unit 120. The first contact portion 410 and the second contact portion 420 may vary in shape or number depending on the contact surface. In particular, the first contact portion 410 and the second contact portion 420 may be in contact with the lower surface and the upper surface of the light guide unit 120, respectively, to prevent the light guide unit 120 from moving in the vertical direction.

In addition, one of the first contact portion 410 or the second contact portion 420 may be formed to extend from the front of the light guide unit 120 to the rear thereof, and the other of the first contact portion 410 or the second contact portion 420 may be formed to extend from the rear of the light guide unit 120 to the front thereof. This configuration may prevent the light guide unit 120 from moving in a front-rear direction (i.e., the horizontal direction) as well as the vertical direction, which will be described later in more detail.

In the exemplary embodiment of the present disclosure, the first contact portion 410 may extend rearward from the front of the light guide unit 120, and the second contact portion 420 may extend forward from the rear of the light guide unit 120. This is because when the second contact portion 420 that is in contact with the upper surface of the light guide unit 120 extends rearward from the front of the light guide unit 120, the upper surface of the light guide 121 may be obstructed. However, the present disclosure is not limited thereto, and when the upper surface of the light guide 121 is unobstructed even if the second contact portion 420 extends rearward from the front of the light guide unit 120, the first contact portion 410 may extend forward from the rear of the light guide unit 120 and the second contact portion 420 may extend rearward from the front of the light guide unit 120.

The first contact portion 410 may be formed to extend rearward from the bezel 200 to be in contact with at least a portion of the lower surface of the light guide unit 120. As a result, the lower surface of the light guide unit 120 may be seated on the first contact portion 410.

In the exemplary embodiment of the present disclosure, the bezel 200 may include an opening 210 formed to guide the lens unit 520, in which the first contact portion 410 is formed along a lower end of an outer circumferential ends of the opening 210. This is because the light guide unit 120 is disposed near the lower end of the opening 210 of the bezel 200. However, the present disclosure is not limited thereto, and a position at which the first contact portion 410 is formed may vary depending on a position of the light guide unit 120.

The second contact portion 420 may be formed to extend forward from the reflector 300 disposed at the rear of the bezel 200 to allow the second contact portion 420 to be in contact with at least a portion of the upper surface of the light guide unit 120. The second contact portion 420 may fix the position of the light guide unit 120 together with the first contact portion 410. In other words, the lamp for the vehicle 1 of the present disclosure may allow the position of the light guide unit 120 to be fixed when the bezel 200 and the reflector 300 are assembled. Accordingly, the position of the light guide unit 120 may be fixed without using a separate structure or component for fixing the position of the light guide unit 120. Therefore, the configuration or assembly process may be simplified.

The first contact portion 410 may include a locking jaw 411 in the front of the light guide unit 120, and the locking jay 411 may be formed to protrude upward from an upper surface of the first contact portion 410 on which the lower surface of the light guide unit 120 is seated. When the light guide unit 120 is seated on the first contact portion 410, the locking jaw 411 may cover a lower end of a front surface of the light guide unit 120. Due to the locking jaw 411, the light guide unit 120 may be prevented from moving forward.

In addition, the extension portion 122 of the light guide unit 120 may include a locking protrusion 122*a* configured to be retained by a locking groove 310 formed in the reflector 300. As such, when the first contact portion 410 is disposed to contact the lower surface of the light guide 121, and the second contact portion 420 is disposed to contact the upper surface of the extension portion 122, the light guide unit 120 may be prevented from moving in the vertical direction, and the light guide unit 120 may be prevented from moving in the horizontal direction as well due to the locking jaw 411 of the first contact portion 410 and the locking protrusion 122*a* of the extension portion 122. Therefore, the light guide unit 120 may be prevented from being displaced out of the position thereof, and the shape of the image formed by the lamp for the vehicle 1 of the present disclosure may be prevented from becoming incomplete.

In the exemplary embodiment of the present disclosure, the first contact portion 410 may contact the lower surface of the light guide 121. However, the present disclosure is not limited thereto, and the first contact portion 410 may be disposed to contact both the lower surface of the light guide 121 and the lower surface of the extension portion 122 depending on dimensions of the light guide unit 120.

In addition, in the exemplary embodiment of the present disclosure, the upper surface of the light guide 121 may be disposed above the upper surface of the extension portion 122, and an end of the second contact portion 420 may contact a stepped surface 123 formed between the upper surface of the light guide 121 and the upper surface of the extension 122, so that the light guide unit 120 may be prevented from moving in the front-rear direction together with the locking jaw 411 of the first contact portion 410 and the locking protrusion 122*a* of the extension portion 122.

In the exemplary embodiment of the present disclosure as described above, the first contact portion 410 and the second contact portion 420 may contact the lower surface of the light guide 121 and the upper surface of the extension 122, respectively, so that the light guide unit 120 may be prevented from moving in the vertical direction, and the light guide unit 120 may be prevented from moving in the front-rear direction by the locking jaw 411 of the first contact portion 410 and the locking protrusion 122*a* of the extension portion 122. However, the present disclosure is not limited thereto, and each of the first contact portion 410 and the second contact portion 420 may contact the opposite surfaces in the vertical direction and the front-rear direction in the light guide unit 120, respectively, so that the light guide unit 120 may be prevented from moving in the vertical direction and in the horizontal direction.

Figure 9:
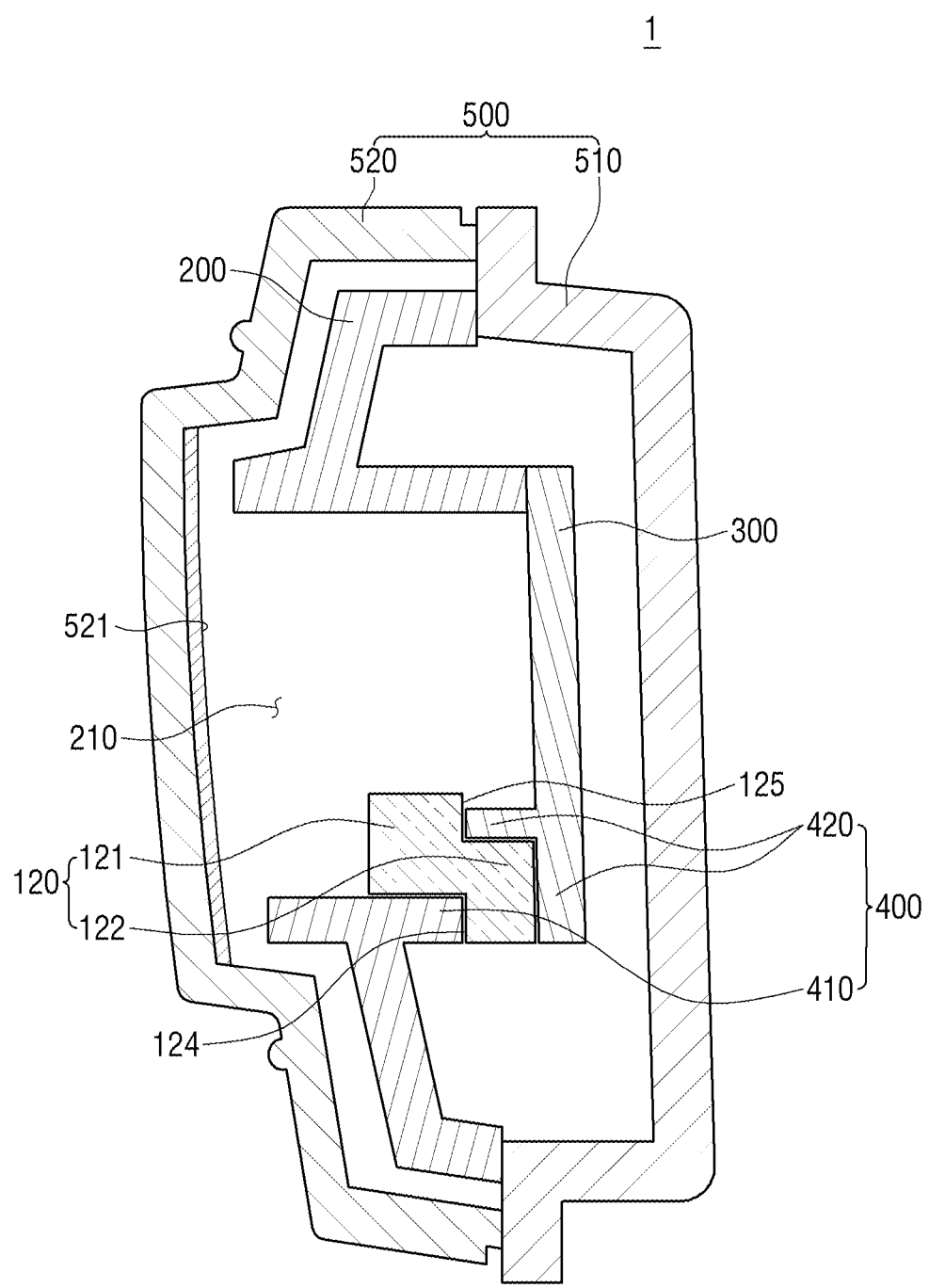
FIGS. 9 and 10 are cross-sectional views showing a lamp for a vehicle according to another exemplary embodiment of the present disclosure.

FIG. 9 is a cross-sectional view showing a lamp for a vehicle according to another exemplary embodiment of the present disclosure. Referring to FIG. 9, the lamp for the vehicle 1 according to another exemplary embodiment of the present disclosure may include the light source unit 100, the plurality of lamp components 200 and 300, and the position fixing unit 400, which are accommodated within the lamp assembly 500 including the lamp housing 510 and the lens unit 520. In the another exemplary embodiment of the present disclosure, the same reference numerals will be used to refer to components with similar functions as the exemplary embodiment described above, and a detailed description thereof will be omitted.

In the another exemplary embodiment of the present disclosure, the position fixing unit 400 may include a first contact portion 410 and a second contact portion 420, in which the first contact portion 410 may be formed to extend rearward from the bezel 200, and the second contact portion 420 may be formed to extend forward from the reflector 300.

In particular, in the light guide unit 120 of the another exemplary embodiment of the present disclosure, the lower surface of the light guide 121 may be disposed above the lower surface of the extension portion 122, and similarly, the upper surface of the light guide 121 may be disposed above the upper surface of the extension 122. As a result, a first stepped surface 124 may be formed between the lower surface of the light guide 121 and the lower surface of the extension portion 122, and a second stepped surface 125 may also be formed between the upper surface of the light guide 121 and the upper surface of the extension portion 122. An end of the first contact portion 410 may be in contact with the first stepped surface 124, and an end of the second contact portion 420 may be in contact with the second stepped surface 125.

In addition, the second contact portion 420 may be formed to contact the opposite surface of the first stepped surface 124 as well as the upper surface of the extension 122. As such, the first contact portion 410 may be in contact with the lower surface of the light guide 121, and at the same time, the end of the first contact portion 410 may be in contact with the first stepped surface 124. In addition, the second contact portion 420 may be in contact with the upper surface of the extension portion 122 and the opposite surface of the first stepped surface 124, and at the same time, the end of the second contact portion 420 may be in contact with the second stepped surface 125. Therefore, the light guide unit 120 may be prevented from moving in the vertical direction, and at the same time, in the horizontal direction.

Figure 10:
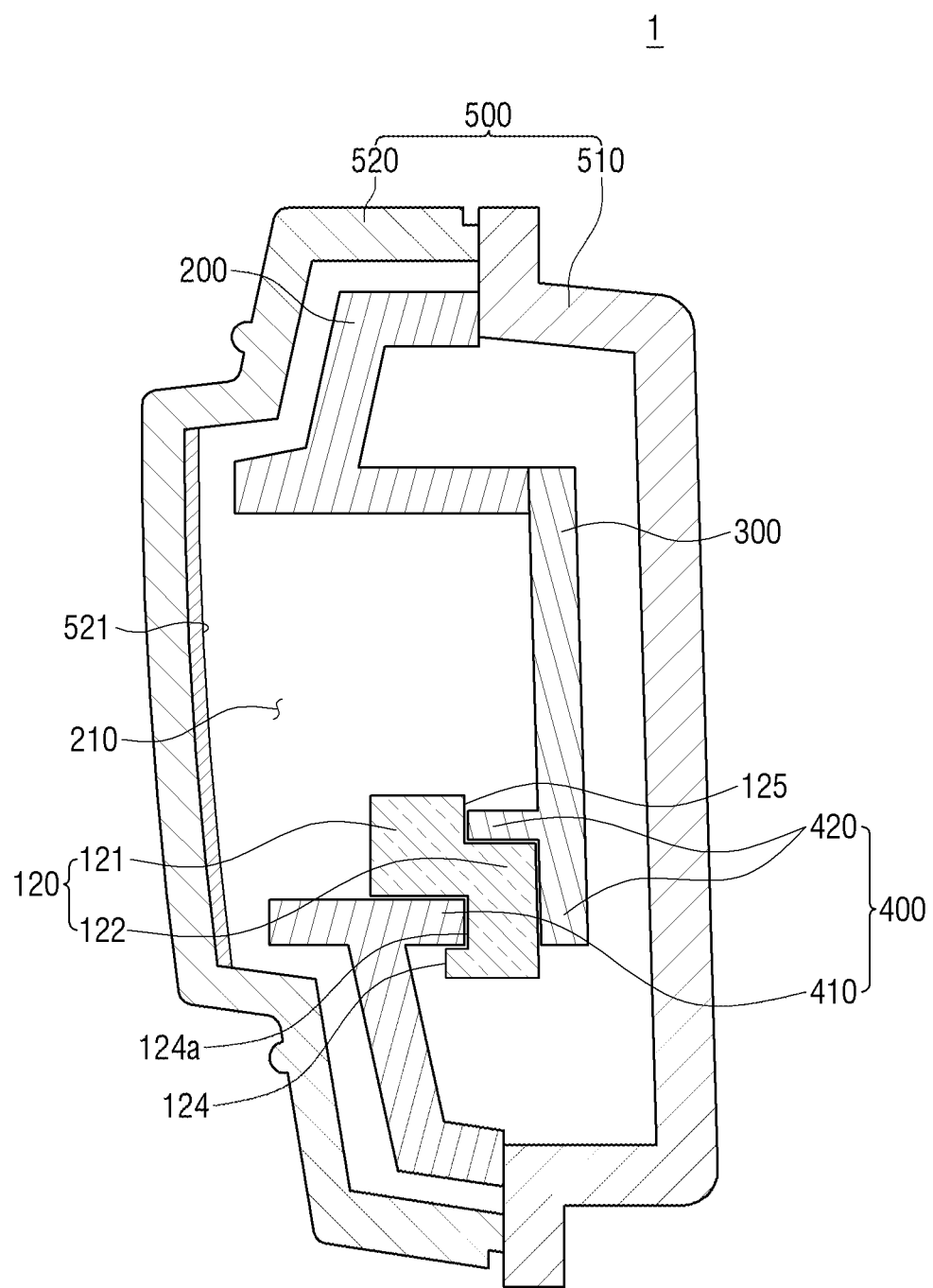

As shown in FIG. 10, an insertion groove 124*a* into which at least one end of the first contact portion 410 or the second contact portion 420 is inserted may be formed in at least one of the first stepped surface 124 or the second stepped surface 125, thereby effectively preventing the light guide unit 120 from being displaced from the correct position. FIG. 10 illustrates an example in which the insertion groove 124*a* into which the end of the first contact portion 410 is inserted is formed in the first stepped surface 124. However, the present disclosure is not limited thereto, and an insertion groove into which the end of the second contact portion 420 is inserted may also be formed in the second stepped surface 125.

In the exemplary embodiments of the present disclosure as described above, the first contact portion 410 may be formed on the bezel, which is the first lamp component 200, and the second contact portion 300 is formed on the reflector, which is the second lamp component 300. However, this is only one example to help understand the present disclosure. The present disclosure is not limited thereto, and they may be formed at various positions capable of fixing the position of the light guide unit 120.

Figure 11:
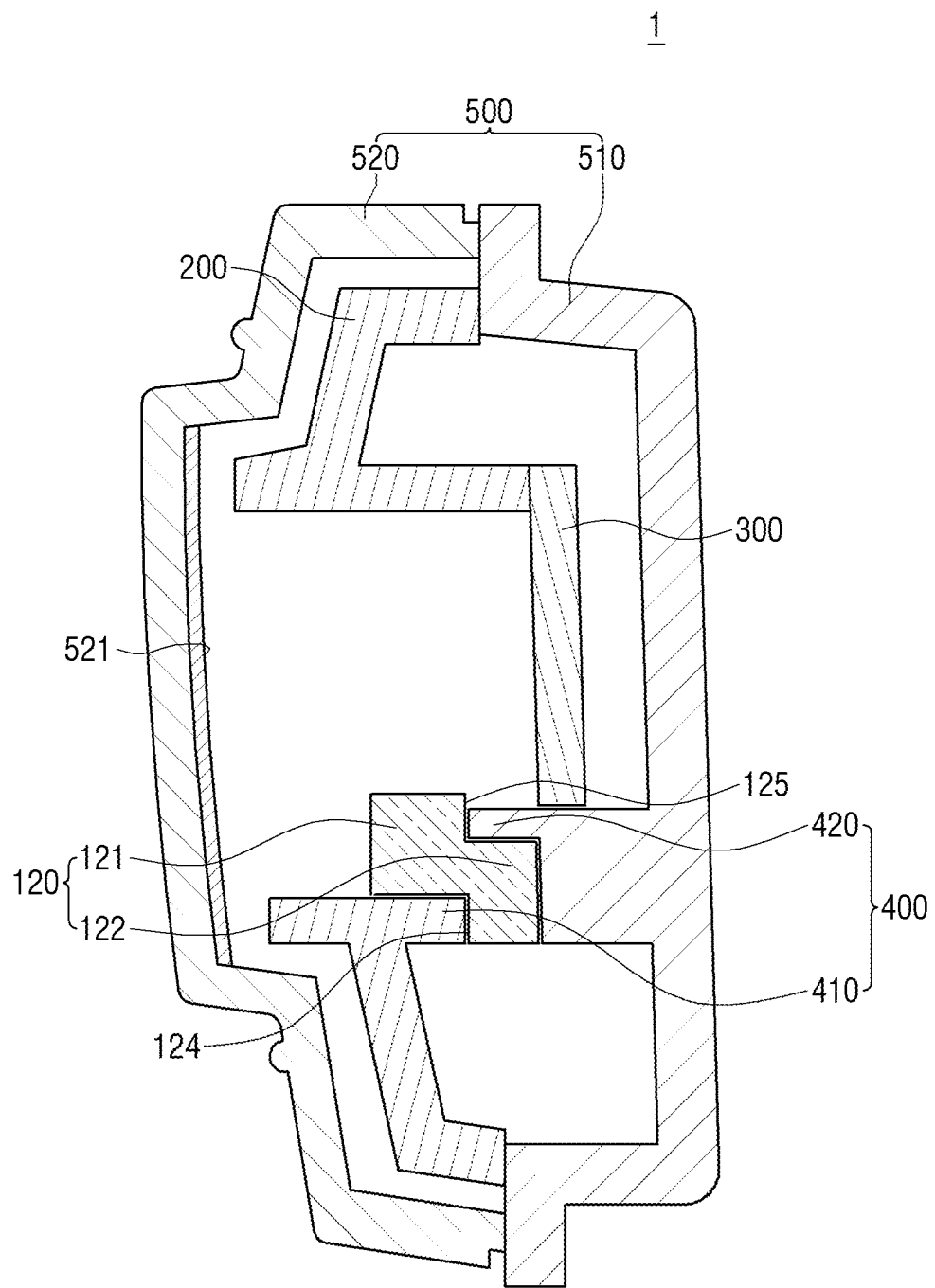
FIG. 11 is a cross-sectional view showing a lamp for a vehicle according to yet another exemplary embodiment of the present disclosure.

FIG. 11 is a cross-sectional view showing a lamp for a vehicle according to yet another exemplary embodiment of the present disclosure. Referring to FIG. 9, the lamp for the vehicle 1 according to yet another exemplary embodiment of the present disclosure may include the light source unit 100, the plurality of lamp components 200 and 300, and the position fixing unit 400, which are accommodated within the lamp assembly 500 including the lamp housing 510 and the lens unit 520. In the yet another exemplary embodiment of the present disclosure, the same reference numerals will be used to refer to components with similar functions as the exemplary embodiments described above, and a detailed description thereof will be omitted.

In the yet another exemplary embodiment of the present disclosure, similar to the exemplary embodiments as described above, the first contact portion 410 may be formed in the bezel, which is the first lamp component 200, and the second contact portion 420 may be formed in the lamp housing 510. In this case, similar to FIG. 9 as described above, the first contact portion 410 may be in contact with the lower surface of the light guide 121, and at the same time, the end of the first contact portion 410 may be in contact with the first stepped surface 124. In addition, the second contact portion 420 may be in contact with the upper surface of the extension portion 122 and the opposite surface of the first stepped surface 124, and at the same time, the end of the second contact portion 420 may be in contacts with the second stepped surface 125. Accordingly, the light guide unit 120 may be also prevented from moving in the vertical direction, and at the same time, in the horizontal direction.

In the exemplary embodiments of the present disclosure as described above, the structures that prevent the light guide unit 120 from moving in the vertical direction and the horizontal direction have been described separately. However, the present disclosure is not limited thereto, and at least some of the structures of the exemplary embodiments may be combined with each other as long as structural interference does not occur.

As described above, according to the lamp for the vehicle 1 of the present disclosure, the position of the light source unit 100 may be fixed when assembling between each component of the lamp for the vehicle 1 of the present disclosure without adding a separate structure for fixing the position of the light source unit 100. Therefore, the number of parts may be reduced, and the configuration may be simplified.

In concluding the detailed description, those skilled in the art will appreciate that many variations and modifications can be made to the exemplary embodiments without substantially departing from the principles of the present disclosure. Therefore, the disclosed exemplary embodiments of the disclosure are used in a generic and descriptive sense only and not for purposes of limitation.

What is claimed is:

1. A lamp for a vehicle provided in a side mirror of the vehicle, comprising:
   a light source unit including a light source and a light guide unit which emits light incident from the light source to form an image having a predetermined shape;
   a lamp assembly including a lamp housing and a lens unit coupled to the lamp housing to form a space for accommodating the light source unit and a plurality of lamp components;
   a position fixing unit formed on one side in the lamp assembly to fix a position of the light source unit, wherein the position fixing unit comprises:
      a first contact portion that contacts at least a portion of a lower surface of the light guide unit; and
      a second contact portion that contacts at least a portion of an upper surface of the light guide unit; and
   a half mirror disposed in front of the light guide unit, wherein the half mirror and a lamp component that faces the half mirror among the plurality of lamp components reflect the light emitted from the light guide unit to each other to form an original image of the light guide unit and at least one repetitive image formed by reflecting the original image.

2. The lamp for the vehicle of claim 1, wherein the light guide unit comprises:
   a light guide to form the image; and
   an extension portion formed to extend rearward from the light guide.

3. The lamp for the vehicle of claim 2, wherein the first contact portion contacts the lower surface of the light guide.

4. The lamp for the vehicle of claim 2, wherein the first contact portion contacts both the lower surface of the light guide and a lower surface of the extension portion.

5. The lamp for the vehicle of claim 2, wherein the second contact portion contacts an upper surface of the extension portion.

6. The lamp for the vehicle of claim 2, wherein the first contact portion is formed to extend from a front of the light guide unit toward a rear thereof, and
   wherein the second contact portion is formed to extend from the rear of the light guide unit toward the front thereof.

7. The lamp for the vehicle of claim 6, wherein the plurality of lamp components comprise:
   a first lamp component in which the first contact portion is formed; and
   a second lamp component disposed behind the first lamp component and having the second contact portion formed therein.

8. The lamp for the vehicle of claim 7, wherein the first lamp component is a bezel disposed in front of the light source unit to guide the light generated from the light source unit to the lens unit, and
   wherein the second lamp component is a reflector disposed behind the light source unit and reflecting the light generated from the light source unit forward.

9. The lamp for the vehicle of claim 7, wherein the first lamp component is a bezel disposed in front of the light source unit to guide the light generated from the light source unit to the lens unit, and
   wherein the second lamp component is the lamp housing disposed behind the light source unit.

10. The lamp for the vehicle of claim 7, wherein the second lamp component includes a locking groove into which a locking projection formed on the extension portion is inserted.

11. The lamp for the vehicle of claim 6, wherein the first contact portion comprises a locking jaw formed to protrude upward from a surface on which the lower surface of the light guide unit is seated in the front of the light guide unit.

12. The lamp for the vehicle of claim 2, wherein each of the first contact portion and the second contact portion is formed to contact opposite surfaces of the light guide unit in a vertical direction and opposite surfaces of the light guide unit in a horizontal direction.

13. The lamp for the vehicle of claim 2, wherein a lower surface of the light guide is disposed above a lower surface of the extension portion, and wherein an end portion of the first contact portion contacts a stepped surface between the lower surface of the light guide and the lower surface of the extension portion.

14. The lamp for the vehicle of claim 2, wherein an upper surface of the light guide is disposed above an upper surface of the extension portion, and wherein an end portion of the second contact portion contacts a stepped surface between the upper surface of the light guide and the upper surface of the extension portion.

15. The lamp for the vehicle of claim 1, wherein at least one of the upper surface or the lower surface of the light guide unit includes a stepped surface having an insertion groove into which an end of the first contact portion or the second contact portion is inserted.

16. The lamp for the vehicle of claim 1, wherein the half mirror is formed on at least one surface of the lens unit.

17. The lamp for the vehicle of claim 1, further comprising:

an inner lens disposed behind the lens unit, wherein the half mirror is formed on at least one surface of the inner lens.

* * * * *